(12) United States Patent
Wang et al.

(10) Patent No.: US 10,314,003 B2
(45) Date of Patent: Jun. 4, 2019

(54) POSITIONING IN WLAN SYSTEMS

(71) Applicant: Telefonaktiebolaget LM Ericsson (publ), Stockholm (SE)

(72) Inventors: Meng Wang, Sundbyberg (SE); Soma Tayamon, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/765,392

(22) PCT Filed: Oct. 13, 2016

(86) PCT No.: PCT/SE2016/050986
§ 371 (c)(1),
(2) Date: Apr. 2, 2018

(87) PCT Pub. No.: WO2017/078591
PCT Pub. Date: May 11, 2017

(65) Prior Publication Data
US 2018/0295601 A1 Oct. 11, 2018

Related U.S. Application Data

(60) Provisional application No. 62/252,091, filed on Nov. 6, 2015.

(51) Int. Cl.
*H04W 64/00* (2009.01)
*H04B 7/06* (2006.01)
(Continued)

(52) U.S. Cl.
CPC ............. *H04W 64/006* (2013.01); *G01S 1/44* (2013.01); *G01S 5/12* (2013.01); *G01S 13/74* (2013.01);
(Continued)

(58) Field of Classification Search
CPC .. H04B 7/0617; H04B 7/0417; H04B 7/0626; H04B 7/0634; H04B 7/0689;
(Continued)

(56) References Cited

U.S. PATENT DOCUMENTS 9,078,153 B1 7/2015 Schelstraete et al.
9,118,103 B1 8/2015 Banerjea
(Continued)

FOREIGN PATENT DOCUMENTS

WO WO 2012/096607 A1 7/2012
WO WO 2015/130712 A1 9/2015

OTHER PUBLICATIONS

International Search Report and Written Opinion of the International Searching Authority for International Application No. PCT/SE2016/050986 dated Dec. 1, 2016, 13 pages.
(Continued)

*Primary Examiner* — Nimesh Patel
(74) *Attorney, Agent, or Firm* — Sage Patent Group

(57) ABSTRACT

A method for enabling angle-based positioning of a wireless device in a Wireless Local Area Network, WLAN, system comprises the steps of extracting directional information from beamforming information comprised in channel sounding feedback obtained from a wireless device and estimating an angular direction to said wireless device based on said extracted directional information.

20 Claims, 13 Drawing Sheets

(51) Int. Cl.
*G01S 1/44* (2006.01)
*G01S 5/12* (2006.01)
*G01S 13/74* (2006.01)
*G01S 13/87* (2006.01)
*H04W 84/12* (2009.01)

(52) U.S. Cl.
CPC .............. *G01S 13/876* (2013.01); *H04B 7/06* (2013.01); *H04B 7/0617* (2013.01); *H04B 7/0619* (2013.01); *H04W 84/12* (2013.01)

(58) Field of Classification Search
CPC .. H04B 7/0632; H04B 7/0421; H04B 7/0628; H04B 7/0641; H04B 7/066; H04B 7/0619; H04B 7/024; H04B 7/065; H04B 7/0456; H04B 17/345; H04B 7/0413; H04B 7/0643; H04B 7/061; H04B 7/0695; H04B 7/086; H04B 7/043; H04B 7/0434; H04B 17/24; H04B 17/318; H04B 17/336; H04B 17/00; H04L 1/0026; H04L 5/0053; H04L 25/0204; H04L 5/0037; H04L 5/0055; H04L 2025/03426; H04L 25/0202; H04L 25/0224; H04L 5/006; H04L 1/0004; H04L 63/08; H04L 67/104; H04L 2209/80; H04L 63/0407; H04L 63/061; H04L 63/123; H04L 63/164; H04L 2209/24; H04L 2209/76; H04L 2463/101; H04L 63/1408; H04L 9/083; H04L 9/3263; H04L 61/1511; H04L 63/12; H04L 9/321; H04L 9/3226; H04L 9/3247; H04L 2463/102; H04L 63/029; H04L 63/0421; H04L 63/083; H04L 63/0853; H04L 63/0876; H04L 65/4076; H04L 65/4084; H04L 67/24; H04L 9/3271; H04L 41/0803; H04L 63/0892; H04L 67/1089; H04L 63/0838; H04L 63/0861; H04L 63/107; H04L 67/22; H04L 5/00; H04W 12/06; H04W 8/12; H04W 84/18; H04W 24/10; H04W 24/02; H04W 36/0083; H04W 72/082; H04W 72/085; H04W 36/08; H04W 88/08; H04W 72/0453; H04W 36/0094; H04W 88/02; H04W 16/18; H04W 36/0061; H04W 36/0088; H04W 64/00; H04W 84/045; H04W 28/08; H04W 36/0072; H04W 36/28; H04W 74/0833; H04W 36/22; H04W 16/24; H04W 28/02; H04W 28/0236; H04W 28/0289; H04W 28/18; H04W 36/0005; H04W 36/0016; H04W 40/12; H04W 40/20

See application file for complete search history.

(56) References Cited

U.S. PATENT DOCUMENTS

| | | | | |
|---|---|---|---|---|
| 2006/0291544 | A1* | 12/2006 | Fischer | H04B 7/0617 375/219 |
| 2009/0291693 | A1* | 11/2009 | Kim | G01S 5/0278 455/456.1 |
| 2012/0020320 | A1* | 1/2012 | Issakov | G01S 5/0221 370/330 |
| 2012/0214512 | A1* | 8/2012 | Siomina | G01S 5/0205 455/456.2 |
| 2012/0302254 | A1* | 11/2012 | Charbit | H04W 4/70 455/456.1 |
| 2013/0130712 | A1* | 5/2013 | Karasudani | G01S 5/0257 455/456.1 |
| 2014/0093005 | A1 | 4/2014 | Xia et al. | |
| 2014/0286246 | A1* | 9/2014 | Bao | H04L 1/0026 370/329 |
| 2014/0335891 | A1 | 11/2014 | Zhang et al. | |
| 2016/0033614 | A1 | 2/2016 | Wang et al. | |

OTHER PUBLICATIONS

Tanuja Satish Dhope et al., "On the Performance of AoA Estimation Algorithms in Cognitive Radio Networks," 2012 International Conference on Communication, Information & Computing Technology (ICCICT), 5 pages (Oct. 19-20, 2012).

IEEE P802.11-REVmc™/D8.0, "Draft Standard for Information technology—Telecommunications and information exchange between systems Local and metropolitan area networks—Specific Requirements," Part 11: Wireless LAN Medium Access Control (MAC) and Physical Layer (PHY) Specifications, 3774 pages (Aug. 2016).

European Search Report and Written Opinion, EP16862556, dated Oct. 15, 2018, 5 pages.

Matthew C. Gast, "802.11ac: A Survival Guide Chapter 4. Beamforming in 802.11 ac", Aug. 1, 2013, pp. 1-27, XP055515103.

* cited by examiner

POSITIONING IN WLAN SYSTEMS

CROSS REFERENCE TO RELATED APPLICATIONS

This application is a 35 U.S.C. § 371 national stage application of PCT International Application No. PCT/SE2016/050986, filed on Oct. 13, 2016, which itself claims priority to U.S. Provisional Application No. 62/252,091 filed Nov. 6, 2015, the disclosure and content of both of which are incorporated herein by reference in their entireties.

TECHNICAL FIELD

The proposed technology generally relates to WLAN systems/networks and more specifically to positioning of wireless devices in such systems/networks.

BACKGROUND

The Wireless Local Area Network, WLAN, technology is a general technology for local wireless communications. As the name implies the Wireless Local Area Network, WLAN, technology offers a basis for wireless communications within a local area coverage. The WLAN technology includes industry-specific solutions as well as proprietary protocols, although most commercial applications are based on well-accepted standards such as the various versions of IEEE 802.11, also popularly referred to as Wi-Fi.

WLAN is standardized in the IEEE 802.11 specifications such as IEEE Standard for Information technology—Telecommunications and information exchange between systems. Local and metropolitan area networks—Specific requirements. Part 11: Wireless LAN Medium Access Control (MAC) and Physical Layer (PHY) Specifications). WLAN systems following the 802.11 MAC specifications operate based on distributed medium or channel access, meaning that each node in the network has more or less equal probability of accessing the medium.

WLAN or Wi-Fi currently mainly operates on the 2.4 GHz or the 5 GHz band. The IEEE 802.11 specifications regulate the access points' or wireless terminals' physical layer, MAC layer and other aspects to secure compatibility and inter-operability between access points, also referred to as APs, and wireless devices or terminals/stations, also referred to as STAs. Wi-Fi is generally operated in unlicensed bands, and as such, communication over Wi-Fi may be subject to interference sources from any number of both known and unknown devices. Wi-Fi is commonly used as wireless extensions to fixed broadband access, e.g. in domestic environments and hotspots, like airports, train stations and restaurants.

WLAN/Wi-Fi Positioning

WLAN- or Wi-Fi-based positioning system is used where Global Positioning System (GPS) is inadequate due to various causes including multipath and signal blockage indoors. Such systems include indoor positioning systems. WLAN/Wi-Fi positioning takes advantage of the rapid growth in the early 21st century of wireless access points in urban areas.

The localization technique used for positioning with wireless access points is usually based on measuring the intensity of the received signal (received signal strength or RSS) and the method of "fingerprinting", see further details below. Typical parameters useful to geolocate the WLAN/Wi-Fi hotspot or wireless access point include the Service Set Identifier (SSID) and the Medium Access Control (MAC) address of the access point. The accuracy depends on the number of positions that have been entered into the database. The WLAN/Wi-Fi hotspot database gets filled by correlating mobile device GPS location data with WLAN/Wi-Fi hotspot MAC addresses. The possible signal fluctuations that may occur can increase errors and inaccuracies in the path of the user. To minimize fluctuations in the received signal, there are certain techniques that can be applied to filter the noise.

In the case of low precision, some techniques have been proposed to merge the WLAN/Wi-Fi traces with other data sources such as geographical information and time constraints (i.e., time geography).

The architecture of a WLAN- or Wi-Fi-based positioning system is shown in FIG. 1. This system incorporates one or more access points (APs), an access controller (AC) and a positioning server. The functions of each component are described as follows:

AP(s): One or more APs are utilized to exchange dedicated frames and/or beacons with terminals or stations (STAs) for positioning purpose. The frames/beacons contain positioning-related information, for example, time stamp, path loss information, etc., based on which STAs perform necessary measurements.

AC: The AC delivers configuration information to the AP(s) to control their behaviours for positioning. In the opposite direction, the measurement results collected at the AP(s) are reported to the AC. Then the AC processes the measurement results and reports the processed data to the positioning server. In certain configurations, the APs may also be able to report the collected data directly to the positioning server.

Positioning server: The positioning server calculates the location of the STA based on the reported data and other available information in the database.

Several techniques have been used for positioning in WLAN/Wi-Fi systems. Those techniques exploit different signal features and may thus require different measurements and apply corresponding algorithms. They can be classified into the following categories:

Received Signal Strength Indicator (RSSI)

In the early version of the IEEE 802.11 standard, the measurement of the distance-dependent signal strength, defined as Received Signal Strength Indication (RSSI), can be used to locate STAs. In principle, the distance between the STA and the AP could be reflected by RSSI based on certain attenuation model. However, RSSI is sensitive to the radio environment and the behaviour of RSSI could be greatly different from the model due to path loss and interference. Hence, RSSI is usually part of the fingerprinting method that searches for a best match between a stored geographical map of radio properties and the measured radio properties. RSSI is an important one among such radio properties.

Time of Arrival (TOA) and Round Trip Time (RTT)

The time measurement based methods measure the travel time between the STA and the AP and translates the travel time into the distance between the pair.

In the standard [1], the Time of Arrival (TOA) method is supported by that the 802.11 specification has standardized the protocol and signalling for time-stamp (difference) measurement. For TOA positioning, there must be at least three such pairs so that the location can be determined at the intersection of the three circles created by the measured distances. In addition, given the TOA difference between STA-AP pairs, other trilateration-based algorithms, for example, hyperbolic trilateration, can also be applied.

Different from TOA, the RTT method can measure the distance without requiring time synchronization between the nodes. It measures the time spent by a specific frame in traveling from a transmitter to a receiver and back again to the transmitter. The main challenge is Non-line-of-sight (NLOS) that brings uncertainty in the time measurement.

Fine Timing Measurement (FTM)

Since IEEE 802.11-2012, the standard has specified the use of the timing measurement frames. A capable STA may transmit timing measurement frames addressed to a peer STA/AP. The higher-layer protocol for synchronizing the local clock time between STAs has been standardized as well.

In the upcoming amendments, the feature of Fine Timing Measurement (FTM) is added [1]. The FTM is characterized by a three-stage procedure including negotiation, FTM implementation and reporting the time-stamp of the previous FTM exchange. The time-stamp resolution is expected to improve to the order of 100 ps from that of 10 ns. This substantially increases the theoretical limitation of the positioning accuracy.

Location Fingerprinting

Instead of determining the distance between the user and the AP, in WLAN or Wi-Fi location fingerprinting, the location of the user is determined by comparing obtained sensing samples to a fingerprint map. The fingerprint map should be constructed in advance in an offline phase and collects necessary fingerprints, i.e. distinct sensing samples/values including RSSI, Angle of Arrival (AOA), TOA, etc., at each reference point in the map. The procedure of map construction usually requires a test STA to perform reference measurements either at each point of a fine coordinate grid, or by "walking around" the AP coverage area to collect sufficient fingerprint data.

However, all the methods described above have their drawbacks and hence there is still a need for an improved method for positioning in WLAN systems.

SUMMARY

It is an object to provide methods, devices, network units and a computer program for enabling angle-based positioning of wireless devices in WLAN systems.

This and other objects are met by embodiments of the proposed technology.

An aspect of the embodiments relates to a method for enabling angle-based positioning of a wireless device in a Wireless Local Area Network, WLAN, system. The method comprises the steps of extracting directional information from beamforming information comprised in channel sounding feedback obtained from a wireless device, and estimating an angular direction to the wireless device based on the extracted directional information Another aspect of the embodiments relates to a device configured to enable angle-based positioning of wireless devices in a Wireless Local Area Network, WLAN, system. The device is configured to extract directional information from beamforming information comprised in channel sounding feedback obtained from a wireless device and to estimate an angular direction to the wireless device based on the extracted directional information.

Yet another aspect of the embodiments relates to a network unit comprising a device configured to enable angle-based positioning of wireless devices in a Wireless Local Area Network, WLAN, system according to the above.

Yet another aspect of the embodiments relates to a computer program comprising instructions, which when executed by at least one processor, cause the at least one processor to extract directional information from beamforming information comprised in channel sounding feedback obtained from a wireless device, and to estimate an angular direction to the wireless device based on the extracted directional information.

Yet another aspect of the embodiments relates to a computer-program product comprising a computer-readable medium having stored thereon the computer program according to the above.

Yet another aspect of the embodiments relates to an apparatus for enabling angle-based positioning of wireless devices in a Wireless Local Area Network, WLAN, system. The apparatus comprises an extracting module for extracting directional information from beamforming information comprised in channel sounding feedback obtained from a wireless device, and an estimating module for estimating an angular direction to the wireless device based on the extracted directional information.

Some advantages of the proposed technology are:

The proposed technology is applicable to existing WLAN/Wi-Fi APs without requiring any hardware modification, including e.g. home Wi-Fi APs with three antennas The proposed technology enables a substantial improvement of the positioning (including the AoA estimation) accuracy, in particular for those scenarios with complex multipath propagation environments The proposed technology can be flexibly combined with other AoA estimation methods for further enhanced accuracy The proposed technology can be combined with other indoor positioning techniques, for example, RSSI or time of flight based techniques Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief analysis of the technical problem.

As described in the background section, the current methods used for WLAN-based positioning all have their drawbacks and hence there is still a need for an improved method for positioning in WLAN systems.

Angle of Arrival (AoA) Estimation

There is no existing support for Angle of Arrival (AoA) or other angle-based positioning such as Direction Finding (DF) in the current IEEE 802.11 specification. In the ongoing IEEE 802.11az task group, one of the major tasks is to add Angle of Arrival (AoA) support for the type of "direction finding" applications in the upcoming new specification amendment. However, AoA measurements have been well adopted in other telecommunication systems, e.g. LTE.

AoA or other angular direction estimations exploits multiple antenna elements to measure the angle of arrival of radio waves impinging on the array. AoA determines the direction by measuring the time difference of arrival at individual elements of the array. Generally this measurement is carried out by measuring the difference in received phase. In practice, there are numerous signal processing algorithms for estimating AoA, for example MUSIC, ESPRIT and ROOT MUSIC algorithms.

Wi-Fi Sounding Procedure for Beamforming

Figure 1:
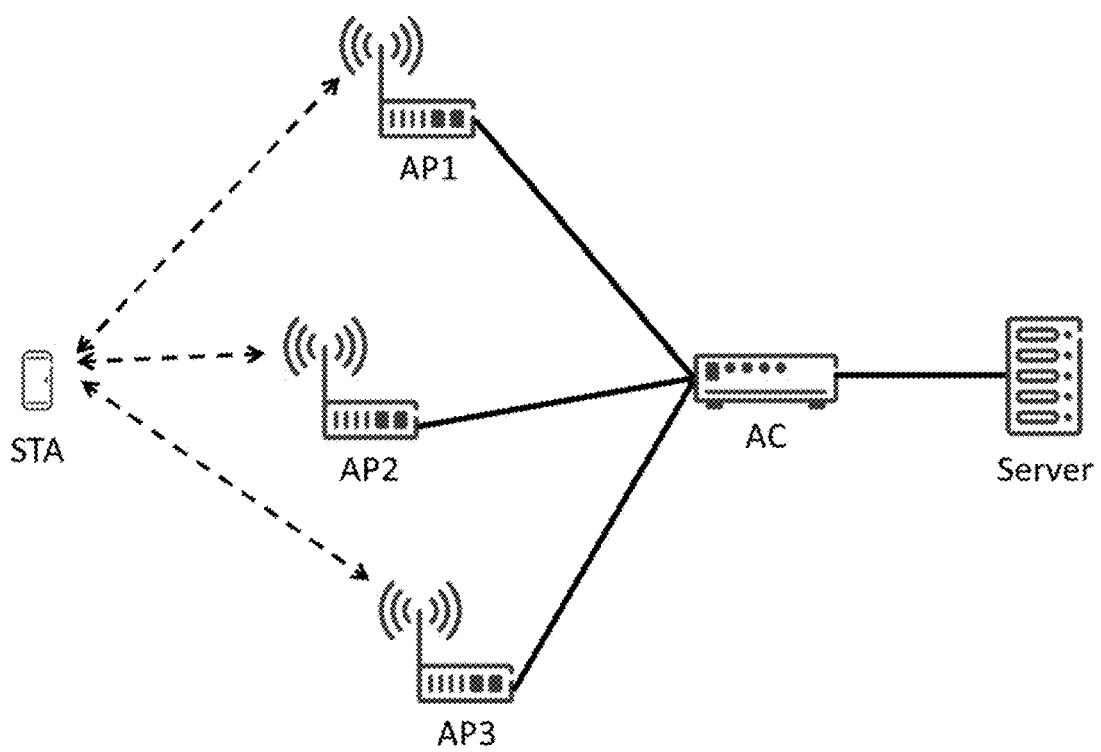
FIG. 1 is a schematic illustration of the network architecture of a WLAN- or Wi-Fi-based positioning system.
Figure 2:
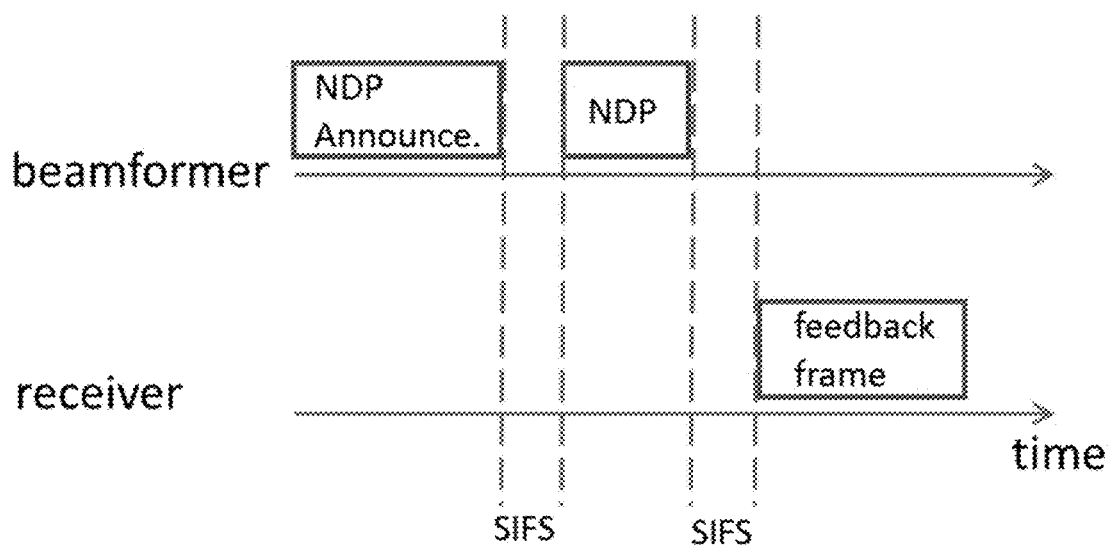
FIG. 2 is a schematic flow diagram illustrating an example of a channel sounding procedure/protocol for beamforming.

In 802.11ac standard, only "explicit" beamforming has been standardized [2], that is, beamforming requires explicit channel measurement by specific sounding frames. Beamforming depends on a channel calibration procedure to determine how to radiate energy in a desired direction. This channel sounding based on null-data packet (NDP) consists of the following major steps as illustrated in FIG. 2.

1. The beamformer first transmits an NDP Announcement frame that is used to gain control of the channel. The desired receiver will respond to it and other STAs will defer channel access in order not to interfere.

2. The beamformer then transmits an NDP frame, which is equivalent to a regular frame with data part removed. Hence, this NDP mainly contains training signals through which the channel can be well estimated.

3. The receiver estimates the channel through the training part of the NDP frame and feeds back a very-high throughput (VHT) compressed beamforming frame that contains channel state information (CSI) between the beamformer and beamformee (receiver) measured using the NDP. The VHT compressed beamforming frame provides a steering matrix compressed via Givens rotation, which is able to save quite much overhead compared to no-compressed beamforming matrices.

4. The beamformer receives the feedback steering matrix and calculates the weighting matrix for beamforming.

Specially, the quantized information about steering matrix is in a form of angles. Consider a general MIMO model $$Y = Hx + n$$

By using singular value decomposition (SVD), the MIMO channel H can be decomposed into $$H = UDV^*$$

where U and V are both unitary matrices, and D is a diagonal matrix consisting of the singular values of H as its diagonal elements. In order to perform eigen-subspace beamforming, the matrix V needs to be fed back to the AP. In practice, due to the limited bit size in the feedback channel, V has to be quantized, and the AP receives a quantized version of V. By applying Given's rotation, the unitary matrix V can fully be described by only a few angles, as shown in Table 1 where the number of such angles is specified for different MIMO sizes. Here we do not go into details of the Given's rotation.

TABLE 1

Angles for compressed beamforming matrices

| M × N | Number of angles | Angles |
|---|---|---|
| 2 × 1 | 2 | $\phi_{1,1}, \psi_{2,1}$ |
| 2 × 2 | 2 | $\phi_{1,1}, \psi_{2,1}$ |
| 3 × 1 | 4 | $\phi_{1,1}, \phi_{2,1}, \psi_{2,1}, \psi_{3,1}$ |
| 3 × 2 | 6 | $\phi_{1,1}, \phi_{2,1}, \psi_{2,1}, \psi_{3,1}, \phi_{2,2}, \psi_{3,2}$ |
| 3 × 3 | 6 | $\phi_{1,1}, \phi_{2,1}, \psi_{2,1}, \psi_{3,1}, \phi_{2,2}, \psi_{3,2}$ |
| 4 × 1 | 6 | $\phi_{1,1}, \phi_{2,1}, \phi_{3,1}, \psi_{2,1}, \psi_{3,1}, \psi_{4,1}$ |
| 4 × 2 | 10 | $\phi_{1,1}, \phi_{2,1}, \phi_{3,1}, \psi_{2,1}, \psi_{3,1}, \psi_{4,1}, \phi_{2,2}, \phi_{3,2}, \psi_{3,2}, \psi_{4,2}$ |
| 4 × 3 | 12 | $\phi_{1,1}, \phi_{2,1}, \phi_{3,1}, \psi_{2,1}, \psi_{3,1}, \psi_{4,1}, \phi_{2,2}, \phi_{3,2}, \psi_{3,2}, \psi_{4,2}, \phi_{3,3}, \psi_{4,3}$ |
| 4 × 4 | 12 | $\phi_{1,1}, \phi_{2,1}, \phi_{3,1}, \psi_{2,1}, \psi_{3,1}, \psi_{4,1}, \phi_{2,2}, \phi_{3,2}, \psi_{3,2}, \psi_{4,2}, \phi_{3,3}, \psi_{4,3}$ |

Furthermore, the angles $\phi$ are quantized between 0 and $2\pi$ and the angles $\psi$ are quantized between 0 and $\pi/2$, as given by $$\phi = \pi\left(\frac{1}{2^{b+2}} + \frac{k}{2^{b+1}}\right) \quad k = 0, 1, \ldots, 2^{b+2} - 1$$

$$\psi = \pi\left(\frac{1}{2^{b+2}} + \frac{k}{2^{b+1}}\right) \quad k = 0, 1, \ldots, 2^{b} - 1$$

The signal processing for AoA or other angular direction estimation usually requires an antenna array with a number of antenna elements deployed e.g. at the APs. This means a substantial increase in hardware cost and computational complexity. To enable low-cost and computationally efficient angular direction estimation in WLAN/Wi-Fi systems, additional system reports/measurements that may contain directional information should be incorporated in angle-based positioning signal processing.

Beamforming has been introduced to Wi-Fi since 802.11n and an "explicit" procedure for channel sounding has been standardized in 802.11ac (see above). The sounding feedback contains beamforming information. The inventors have realized the fact that there is a correlation between angular direction, e.g. AoA, and the beamforming matrix, and based on this fact an angular direction estimation method based on extracting directional information from reported beamforming information, such as the beamforming matrix, is hereby disclosed. A procedure in which the directional information is extracted to assist the angular direction estimation is disclosed, as well as the necessary protocol support enabling the procedure.

Figure 3:
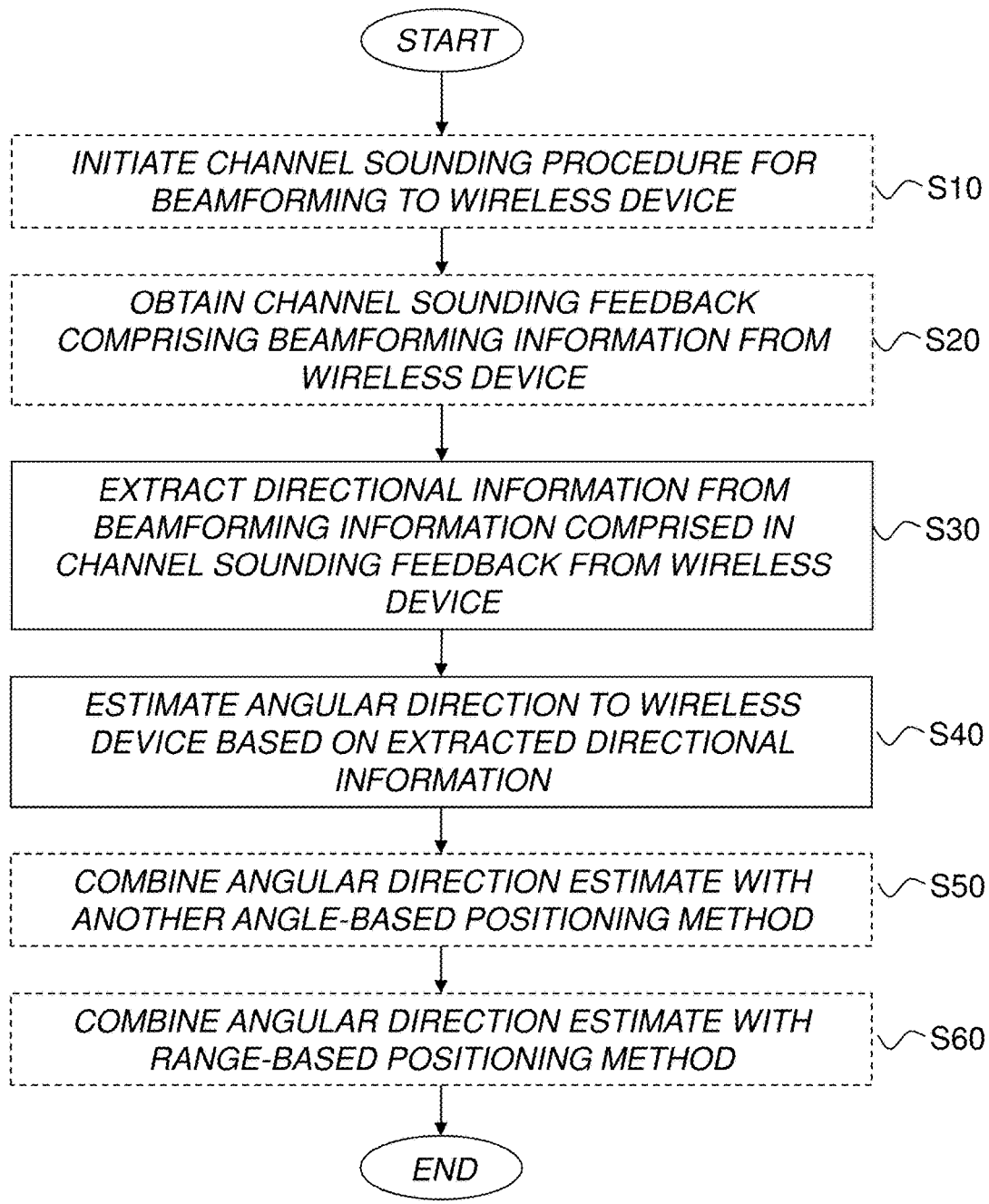
FIG. 3 is a schematic flow diagram illustrating an example of a method for enabling angle-based positioning of wireless devices in a WLAN system according to an embodiment.

According to an embodiment, the directional information contained in the sounding feedback is extracted, based on the fact that the angular direction has a correlation with the direction to which the transmit energy is focused, i.e. beamforming. FIG. 3 is a schematic flow diagram illustrating an embodiment of a method for positioning of a wireless device in a Wireless Local Area Network (WLAN) system. The method comprises the step S30 of extracting directional information from beamforming information comprised in channel sounding feedback obtained from a wireless device, and the step S40 of estimating an angular direction to the wireless device based on the extracted directional information.

In a particular embodiment of the method shown in FIG. 3 the angular direction is calculated as an Angle of Arrival (AoA), but the angular direction may also be expressed as other types of angle-based positions, such as direction finding (DF) in other embodiments.

In a particular embodiment of the method shown in FIG. 3 the method further comprises the step S20 of obtaining channel sounding feedback from the wireless device, where the channel sounding feedback comprises beamforming information as described above. In a particular embodiment, the beamforming information comprises a beamforming matrix. In a particular embodiment the method further comprises the step S10 of initiating a channel sounding procedure for beamforming to the wireless device.

The inventors have realized that the correlation between angular direction, e.g. AoA, and beamforming is stronger for the rank-1 case beamforming than for higher ranks, and hence the sounding procedure is initiated using rank-1 beamforming in a particular embodiment.

To further improve the estimation of the angular direction, the estimated angular direction can be used as an input to more advanced angular direction estimation algorithm or be combined with other positioning technologies, such as range-based positioning methods, for positioning purpose. Thus, in a particular embodiment of the method shown in FIG. 3 the method further comprises the step S50 of combining the estimated angular direction with another angle-based positioning method to obtain an improved estimation of the angular direction. In another particular embodiment of the method shown in FIG. 3 the method further comprises the step S60 of combining the estimated angular direction with a range-based positioning method to obtain an improved estimation of the angular direction.

Figure 4:
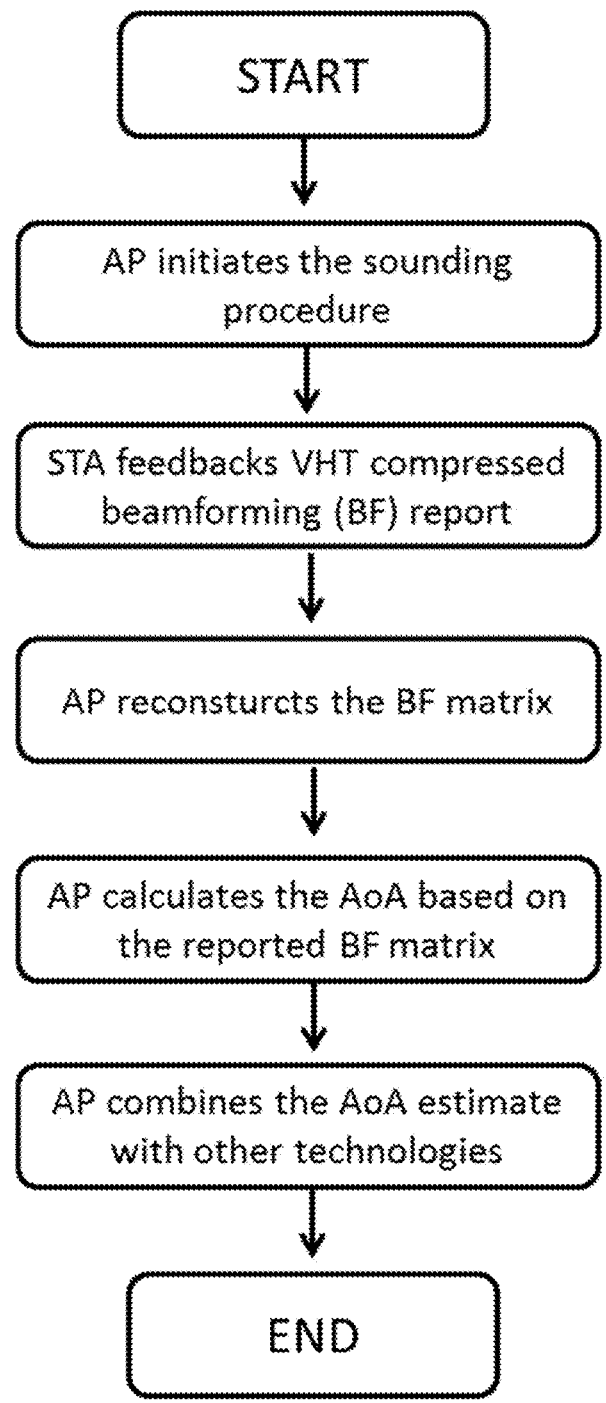
FIG. 4 is a schematic flow diagram illustrating an example of a method for enabling angle-based positioning of wireless devices in a WLAN system according to another embodiment.

FIG. 4 illustrates an example embodiment of the proposed solution. In this procedure, following the sounding protocol (described above), the AP receives a VHT compressed beamforming report, which contains quantized information in relation to the beamforming matrix. Then the AP calculates the AoA estimate based on such reported BF information. Methods for calculating AOA estimate will be described below. The obtained AoA estimate can be either used as an input to more advanced AoA estimation algorithm or combined with other positioning technologies for positioning purpose. Corresponding, non-limiting examples of illustrative embodiments will be described in detail below.

Figure 5:
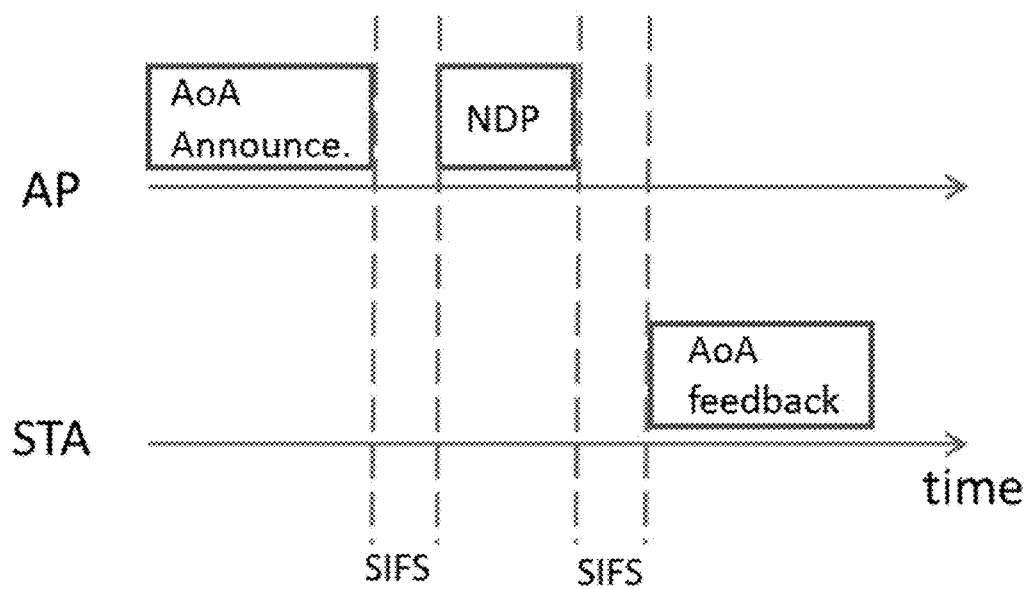
FIG. 5 is a schematic flow diagram illustrating an example of a channel sounding procedure/protocol for beamforming according to an embodiment.

In another embodiment, the sounding protocol is dedicated to AoA estimation; i.e. the sounding protocol is triggered by AoA estimation. To enable this feature, on top of the procedure described in FIG. 4, a dedicated AoA sounding protocol is illustrated in FIG. 5. For the announcement frame, in principle, it could be identical to the NDP announcement or alternatively, it contains additional information to indicate that the STA should feedback dedicated AoA related information. In the responding AoA feedback frame, the contained information can be the angles for compressed beamforming matrices presented in Table 1, or alternatively simplified angle information that is able to reduce the computational burden at the AP side.

AoA Estimation

At the AP side, given the quantized angle values contained in the sounding feedback, the beamforming/steering matrix can be reconstructed, denoted by $\hat{V}$. The first r columns of $\hat{V}$ are used as the transmit beamforming weights, where r is the rank of the channel matrix H.

In one embodiment, for AoA estimation, the AP initiates a sounding procedure for a "close-loop" rank-1 spatial multiplexing, since the correlation between angular direction, e.g. AoA, and beamforming is stronger for the rank-1 case beamforming than for higher ranks. Then the reconstructed beamforming/steering matrix is reduced to a precoding vector, that is, the first column of $\hat{V}$, denoted by $\tilde{v}$.

Figure 6:
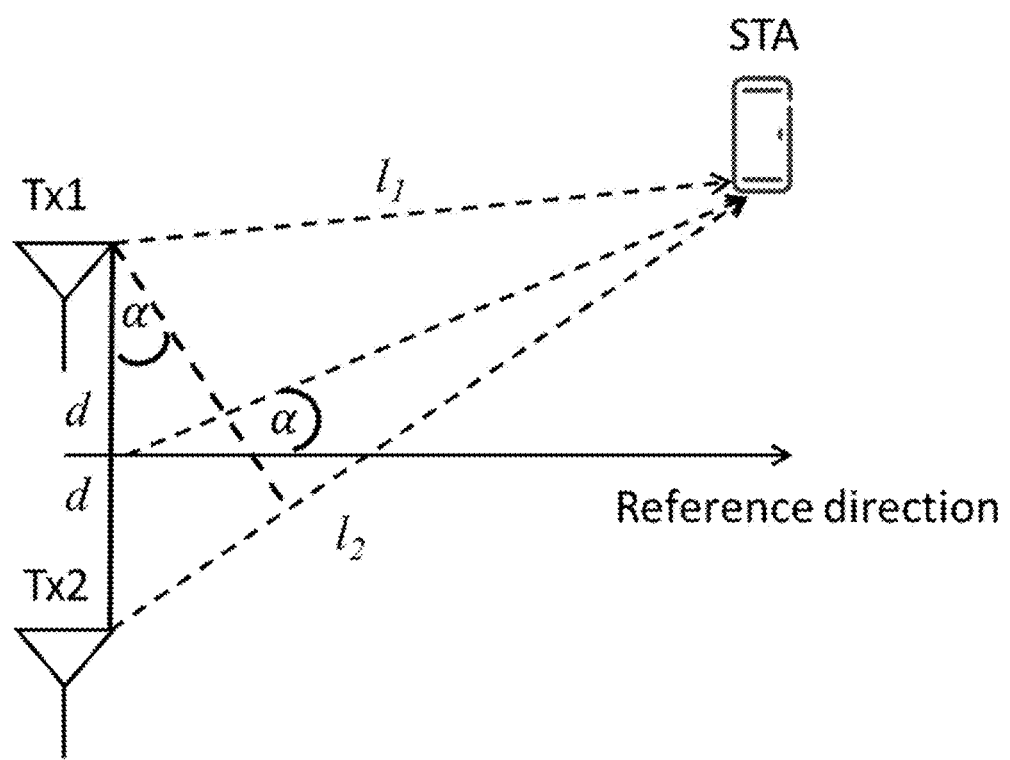
FIG. 6 is an example of a geometrical description of AoA estimation.

Here, the precoding vector is correlated to the relative direction of the STA, i.e. AoA. FIG. 6 illustrates this correlation by a simple example with two Tx antennas at the AP. Suppose that the distance between two antennas is 2d and that the reference direction is perpendicular to the line connecting both antennas. The aim of applying precoding is to ensure that the signals transmitted on both antennas will be constructively overlapped at the STA to enhance the SNR. To maximize the SNR, individual signal should arrive at the STA with the same phase. The path difference from both antennas, i.e. $\Delta l = l_1 - l_2 \ll l_1$, creates a phase difference can be described as $$\Delta \beta = \frac{2\pi f}{c} \Delta l \tag{1}$$

where f and c denote carrier frequency and speed of light, respectively. In order to compensate the phase difference, a typical precoding vector, for example, $[1, e^{-j\Delta\beta}]$ can be applied. On the other hand, geometrically, the angle of arrival/departure $\alpha$ with respect to the reference direction approximately satisfies $$\Delta l \approx 2d \sin \alpha \tag{2}$$

given that $\Delta l \ll l_1$. By combining equation 1 and 2, we can see the relationship between the AoA and the phase shift due to path difference, that is $$\alpha = \arcsin\left(\frac{c\Delta\beta}{4d\pi f}\right) \tag{3}$$

In a particular embodiment, the AoA estimate can be obtained by extracting the information about the phase shift between antennas from the reconstructed beamforming matrix and then calculating the AoA based on the relationship expressed in equation 3.

In one embodiment, the above method can be extended to the systems with multiple equal-spacing transmit antennas. In such systems, the phase shift between neighbor antennas is invariant.

Because the beamforming matrix is reconstructed according to the information bits that represent a set of angle values for Givens rotation when compressing the beamforming (see more details for beamforming matrix compression above), a determined set of such information bits contained in the sound feedback can be mapped to a specific phase shift. In another embodiment, at the AP, the angular direction estimation may be performed by searching a look-up table where there is a direct mapping from the AoA values to received information bits for compressed beamforming matrix. For example, Table 2 shows such a mapping table for a system equipped with two transmit antennas, where each combination of the angle values contained in the sounding feedback (refer to Table 1 for the details of the angle values) is mapped to an AoA estimate.

TABLE 2

A mapping table for angular direction estimation

| Angle values contained in the sounding feedback | AoA estimate values |
| --- | --- |
| $\phi_1, \psi_1$ | $\alpha_1$ |
| $\phi_1, \psi_2$ | $\alpha_2$ |
| $\phi_1, \psi_3$ | $\alpha_3$ |
| ... | ... |

Further Improvements for Angular Direction Estimation

In one embodiment, the angle estimate obtained by the above method may be used as the initial estimate or the input to other angular direction estimation algorithm such as MUSIC and ESPRIT for the systems that are already equipped with a large antenna array.

Combination with Other Technologies

Figure 7:
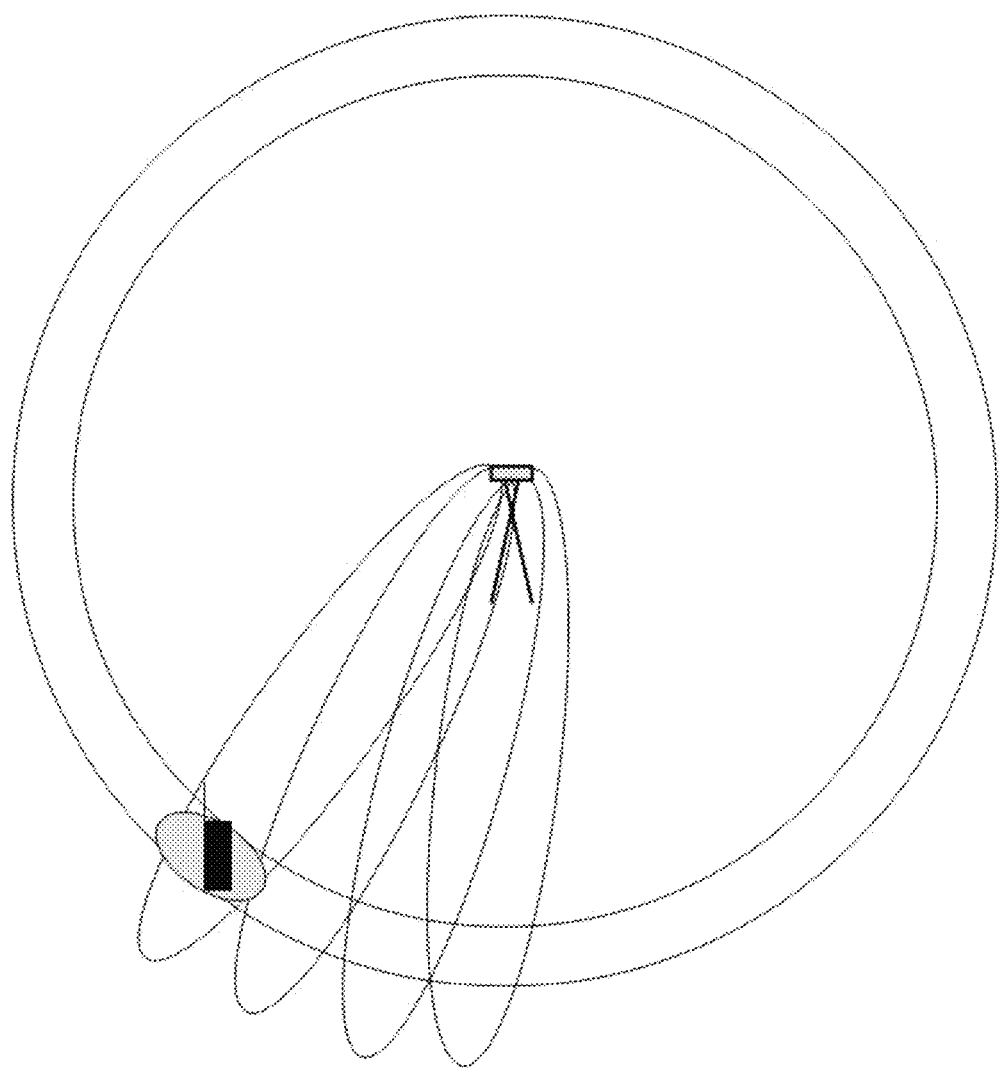
FIG. 7 is a schematic illustration of a combination of AoA estimation and ranging for device positioning.

In other embodiments, the proposed angular direction estimation method may be combined with existing ranging methods, for example, fine timing measurement (FTM) and/or receive signal strength indication (RSSI). As illustrated in FIG. 7, such a combined method enables the AP to location the STA device based on the estimate values of both distance and angle. Specially, this method is very useful for device tracking in the scenarios with a stand-alone AP because the triangulation based method usually requires at least three APs.

The enhanced FTM protocol utilizes the information exchange in the NDP-A and NDP to initiate the FTM procedure. The enhanced procedure is as follows:
1. The NDP-A announces the beamforming to the beamformees and is also, as previously mentioned, used for channel sounding.
2. The NDP itself is extended with the iFTM request to the master node (STA).
3. The STA then sends ACK included in the AoA feedback to the AP and the FTM bursts are initiated by the master node (STA).
4. The FTM based distance together with the AoA estimated with beamforming are combined to retrieve the position of the node.

Figure 8:
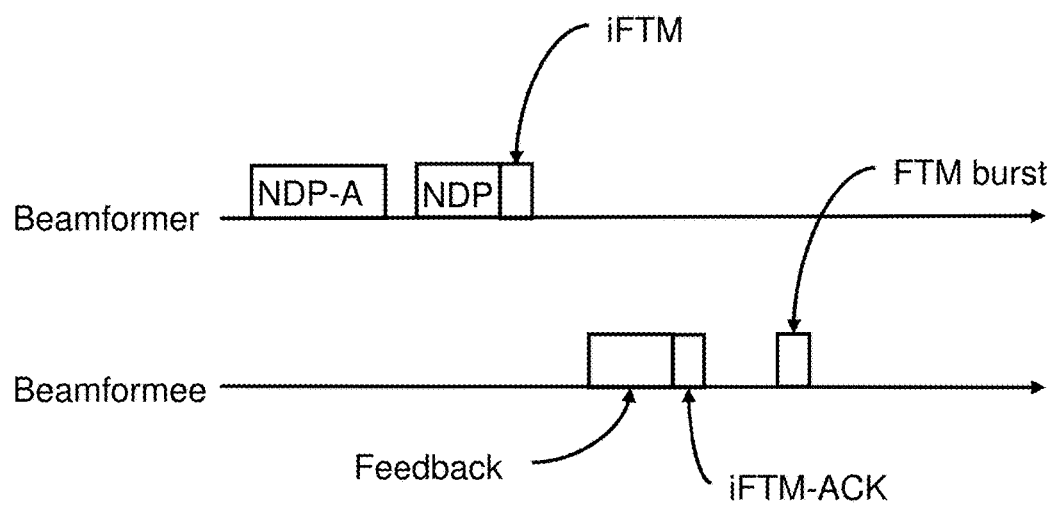
FIG. 8 is a schematic flow diagram illustrating an example of a channel sounding procedure/protocol for beamforming according to an embodiment.

An illustration of the enhanced FTM protocol as an extension of the beamforming procedure is illustrated in FIG. 8.

Thus, some of the key features of the proposed technology are:

The AP initiating sounding and extracting the directional information from the sounding feedback for AoA estimation The AP calculating the AoA estimate based on the information contained in the sounding feedback Combinations with e.g. FTM protocol to improve the accuracy of the current positioning protocol Some advantages of the proposed technology are:

The proposed technology is applicable to existing WLAN/Wi-Fi APs without requiring any hardware modification, including e.g. home Wi-Fi APs with three antennas The proposed technology enables a substantial improvement of the positioning (including the AoA estimation) accuracy, in particular for those scenarios with complex multipath propagation environments The proposed technology can be flexibly combined with other angular direction estimation methods for further enhanced accuracy The proposed technology can be combined with other indoor positioning techniques, for example, RSSI or time of flight based techniques As used herein, the non-limiting term "wireless device", may refer to a mobile station, a mobile terminal, User Equipment (UE), a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network device" may refer to any device located in connection with a communication network, including but not limited to access points, network control nodes such as network controllers, access controllers, and the like. The term network device may also encompass cloud-based network devices.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a device configured to enable angle-based positioning of wireless devices in a Wireless Local Area Network, WLAN, system. The device is configured to extract directional information from beamforming information comprised in channel sounding feedback obtained from a wireless device, and to estimate an angular direction to the wireless device based on the extracted directional information.

As described above, the angular direction may comprise Angle of Arrival, AoA, in an embodiment. Furthermore, in an embodiment the beamforming information may comprise a beamforming matrix.

In an embodiment the device is further configured to combine the estimated angular direction with another angle-based positioning method to obtain an improved estimation of the angular direction. In another embodiment the device is further configured to combine said estimated angular direction with a range-based positioning method to obtain an improved estimation of said angular direction.

Figure 9A:
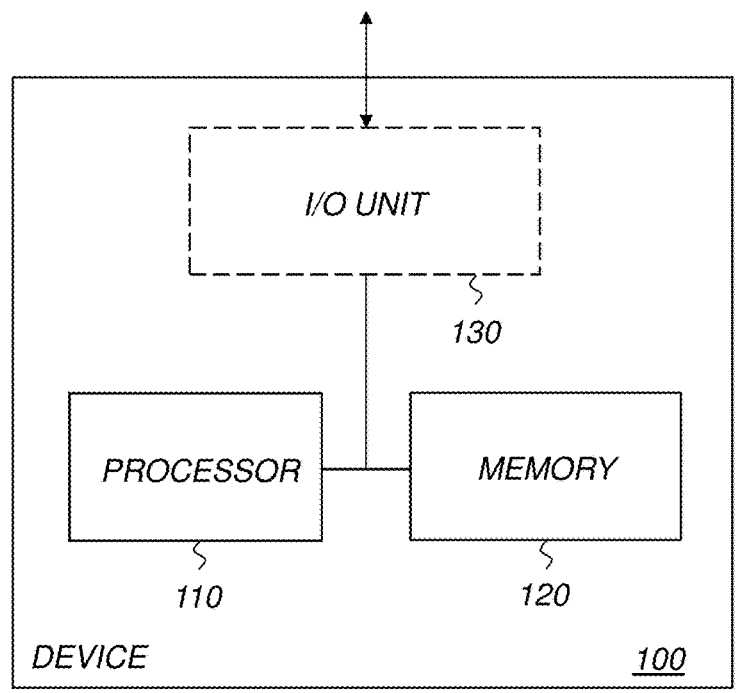
FIGS. 9a and 9b are schematic diagrams illustrating an example of a device configured to enable angle-based positioning of wireless devices in a WLAN system according to an embodiment.

FIG. 9a is a schematic block diagram illustrating an example of a device 100, based on a processor-memory implementation according to an embodiment. In this particular example, the device 100 comprises a processor 110 and a memory 120, the memory 120 comprising instructions executable by the processor 110, whereby the processor is operative to extract directional information from beamforming information comprised in channel sounding feedback obtained from a wireless device, and to estimate an angular direction to the wireless device based on the extracted directional information.

In an embodiment of the device 100 shown in FIG. 9a the processor is further operative to combine the estimated angular direction with another angle-based positioning method to obtain an improved estimation of the angular direction. In another embodiment the processor is further operative to combine the estimated angular direction with a range-based positioning method to obtain an improved estimation of the angular direction.

Optionally, the device 100 may also include an input/output (I/O) unit 130. The I/O unit 130 may include functions for wired and/or wireless communication with other devices and/or network nodes in the network. The I/O unit 130 may be interconnected to the processor 110 and/or memory 120. By way of example, the I/O unit 130 may include input/output (I/O) circuitry, input port(s) and/or output port(s).

Figure 9B:
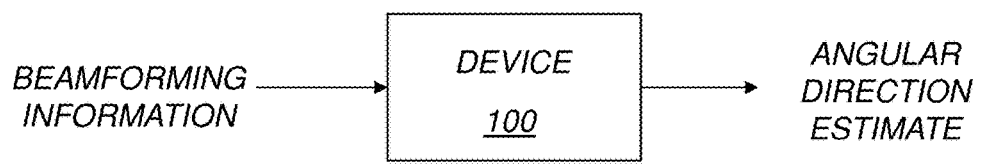

FIG. 9b is a schematic block diagram illustrating input/output to/from the device 100. Beamforming information is input into the device 100 and the estimated angular direction is output from the device 100.

Figure 10:
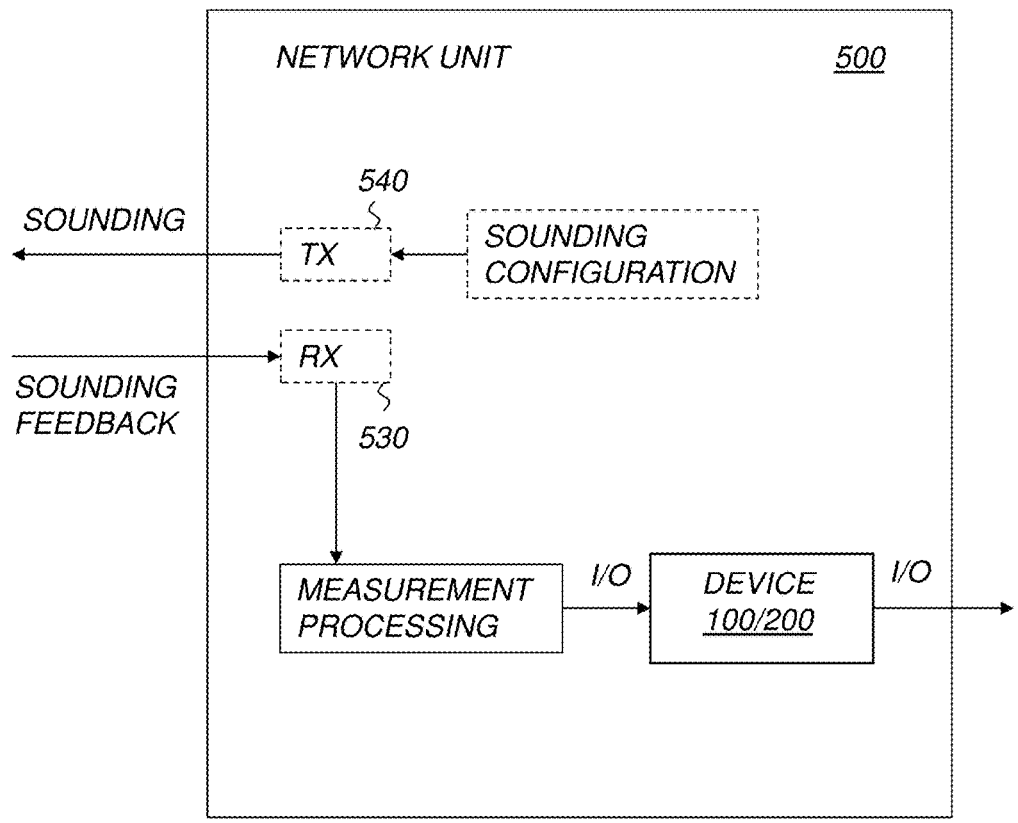
FIG. 10 is a schematic block diagram illustrating an example of a network unit comprising a device configured to enable angle-based positioning of wireless devices in a WLAN system according to an embodiment.

FIG. 10 is a schematic block diagram illustrating an example of a network unit 500 comprising a device 100 according to any of the embodiments. According to an aspect, there is provided a network unit 500 comprising a device 100 as described herein.

The network unit may be any suitable network unit in the WLAN, or a network unit in connection with the WLAN. By way of example, the network unit may be a suitable network node such an access point (AP), or an access controller (AC). However, the network unit may alternatively be a server or a cloud-implemented network unit.

Figure 11:
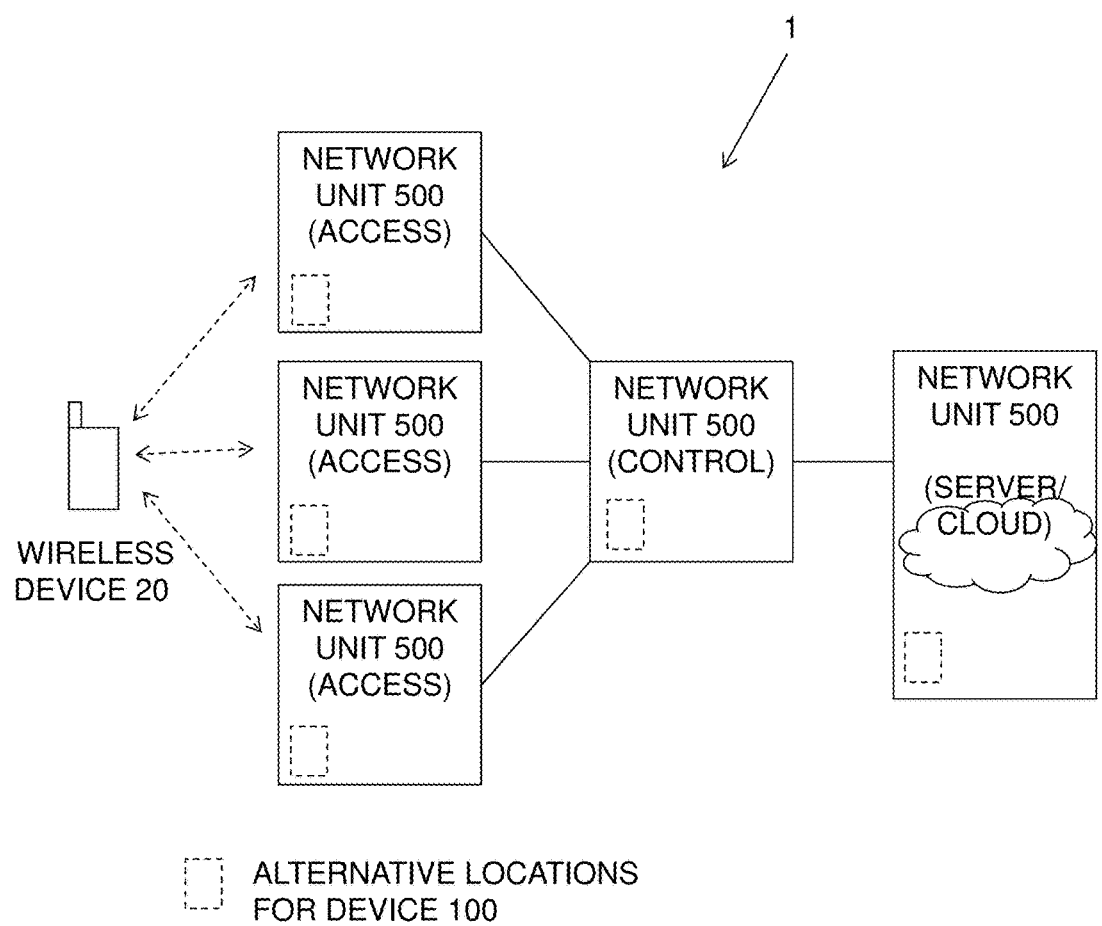
FIG. 11 is a schematic illustration of an example of a WLAN system comprising network units and devices configured to enable angle-based positioning of wireless devices according to an embodiment.

FIG. 11 is a schematic illustration of an example of a WLAN system 1 according to an embodiment. As illustrated in FIG. 11 there are one or more network units providing network access to one or more wireless devices 20, as an example these network units may be access points (AP). There is also at least one network unit providing management/control in the system shown in FIG. 11, as an example this may be an access controller (AC). There is also a network unit/network device which may be e.g. a server, or a cloud-implemented network unit. In the WLAN system illustrated in FIG. 11 the functionality of the device 100 may be located in either of these network units. Thus, in an example embodiment, the network unit 500 may be an access point, AP. In an alternative embodiment the network unit 500 may be an access controller (AC). Furthermore, the network unit 500 may be a cloud-based network unit in another embodiment.

The network unit 500 as shown in FIG. 10 may in an embodiment, for example when the network unit is an AP, be further configured to obtain channel sounding feedback from a wireless device, where the channel sounding feedback comprises beamforming information as described above. In another embodiment the network device 500 may be further configured to initiate a channel sounding procedure for beamforming to the wireless device. In a particular embodiment, the network unit 500 is configured to initiate the channel sounding procedure using rank-1 beamforming.

As schematically illustrated in FIG. 10 the network unit 500 may in an embodiment comprise a transmitter unit (TX) 540 configured to transmit rank-1 beamforming to the wireless device. The network unit 500 shown in FIG. 10 may in an embodiment also comprise a receiver unit (RX) 530 configured to receive channel sounding feedback from the wireless device, where the channel sounding feedback comprises beamforming information.

Figure 12:
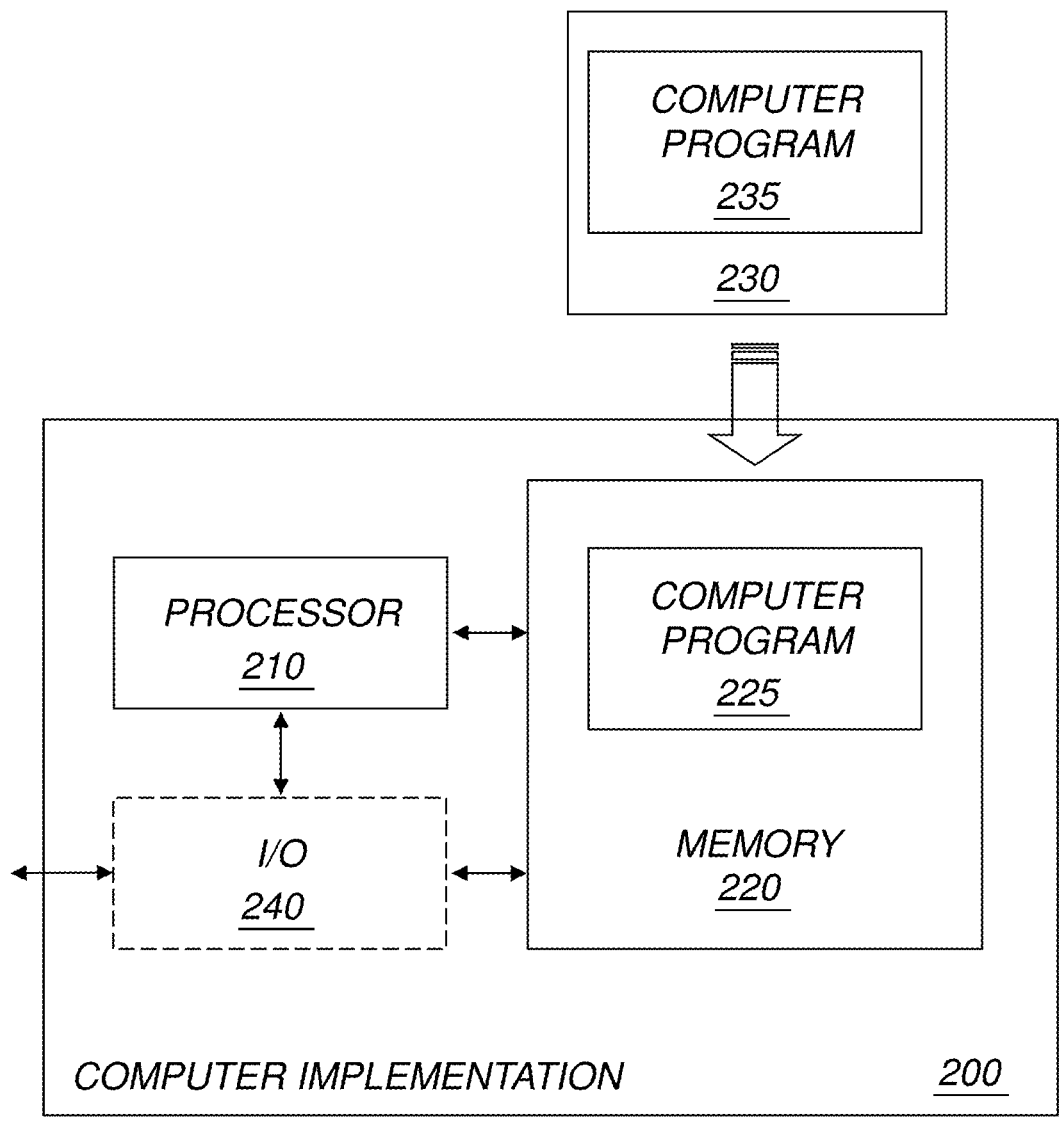
FIG. 12 is a schematic diagram illustrating an example of a computer-implementation according to an embodiment.

FIG. 12 is a schematic diagram illustrating an example of a computer-implementation 200 according to an embodiment. In this particular example, at least some of the steps, functions, procedures, modules and/or blocks described herein are implemented in a computer program 225; 235, which is loaded into the memory 220 for execution by processing circuitry including one or more processors 210. The processor(s) 210 and memory 220 are interconnected to each other to enable normal software execution. An optional input/output device 240 may also be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 210 is thus configured to perform, when executing the computer program 225, well-defined processing tasks such as those described herein.

The processing circuitry does not have to be dedicated to only execute the above-described steps, functions, procedure and/or blocks, but may also execute other tasks.

In a particular embodiment, the computer program 225; 235 comprises instructions, which when executed by at least one processor 210, cause the processor(s) 210 to extract directional information from beamforming information comprised in channel sounding feedback obtained from a wireless device, and to estimate an angular direction to the wireless device based on the extracted directional information.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 13:
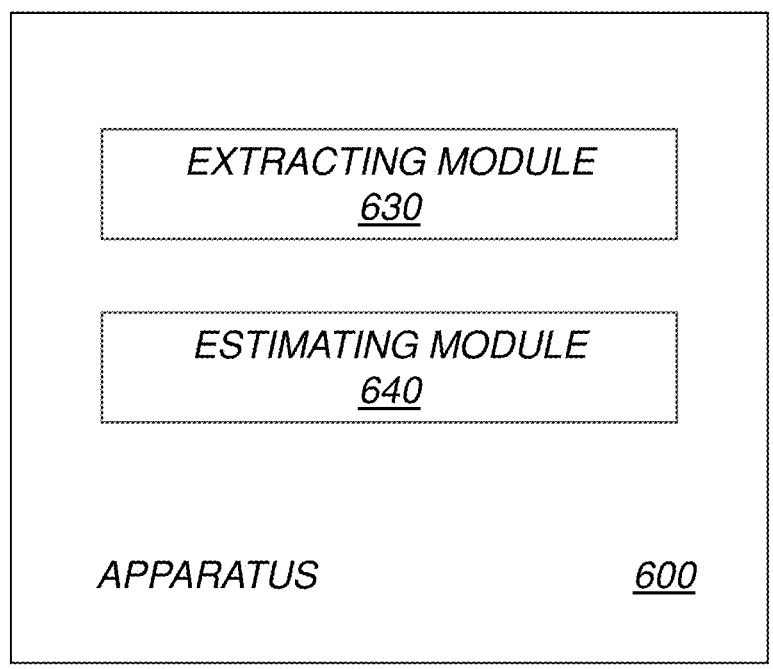
FIG. 13 is a schematic diagram illustrating an example of an apparatus for enabling angle-based positioning of wireless devices in a WLAN system according to an embodiment.

FIG. 13 is a schematic diagram illustrating an example of an apparatus 600 for enabling angle-based positioning of wireless devices in a Wireless Local Area Network, WLAN, system. The apparatus 600 shown in FIG. 13 comprises an extracting module 630 for extracting directional information from beamforming information comprised in channel sounding feedback obtained from a wireless device, and an estimating module 640 for estimating an angular direction to the wireless device based on the extracted directional information.

Alternatively it is possible to realize the module(s) in FIG. 13 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
Consolidation of network functionality into virtualized software running on customized or generic hardware. This is sometimes referred to as network function virtualization.
Co-location of one or more application stacks, including operating system, running on separate hardware onto a single hardware platform. This is sometimes referred to as system virtualization, or platform virtualization.
Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centres, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] IEEE 802.11 REVmc
[2] E. Perahia and R. Stacey, "Next Generation Wireless LANs: 802.11n and 802.11ac", second edition, Cambridge University Press, 2013

The invention claimed is:

1. A method for enabling angle-based positioning of a wireless device in a Wireless Local Area Network, WLAN, system, wherein the method comprises:
   initiating a channel sounding procedure for beamforming to the wireless device using rank-1 beamforming;
   extracting, responsive to initiating the channel sounding procedure, directional information from beamforming information comprised in the channel sounding feedback obtained from a wireless device; and
   estimating an angular direction to the wireless device based on the extracted directional information.

2. The method of claim 1, wherein the method further comprises:
   obtaining the channel sounding feedback from the wireless device, the channel sounding feedback comprising the beamforming information.

3. The method of claim 1, wherein the angular direction comprises an Angle of Arrival, AoA.

4. The method of claim 1, wherein the beamforming information comprises a beamforming matrix.

5. The method of claim 1, wherein the method further comprises:
   combining the estimated angular direction with an output from another angle-based positioning technique to obtain an improved estimation of the angular direction.

6. The method of claim 1, wherein the method further comprises:
   combining the estimated angular direction with an output from a range-based positioning technique to obtain an improved estimation of the angular direction.

7. The method of claim 6, wherein the range-based positioning technique comprises fine timing measurement, FTM.

8. The method of claim 1, further comprising adjusting an input signal to an antenna array to control the antenna array to produce a beamforming signal that is directed based on the estimated angular direction to the wireless device.

9. The method of claim 1, wherein extracting the directional information comprises extracting, by a processing circuit, the directional information from beamforming information comprised in the channel sounding feedback received from the wireless device by an antenna array coupled to the processing circuit,
wherein estimating the angular direction comprises estimating, by the processing circuit, the angular direction to the wireless device relative to the antenna array based on the extracted directional information,
the method further comprising:
determining, by the processing circuit, position information of the wireless device based on the estimated angular direction to the wireless device and location information of the antenna array; and
transmitting the position information to the wireless device.

10. A device configured to enable angle-based positioning of wireless devices in a Wireless Local Area Network, WLAN, system, the device comprising:
an antenna array for receiving channel sounding feedback from a wireless device of the wireless devices using rank-1 beamforming; and
a processing circuit coupled to the antenna array configured to:
extract directional information from beamforming information comprised in the channel sounding feedback;
estimate an angular direction to the wireless device relative to the antenna array based on the extracted directional information;
determine position information of the wireless device based on the estimated angular direction to the wireless device and location information of the antenna array; and
transmit the position information to the wireless device.

11. The device of claim 10, wherein the angular direction comprises an Angle of Arrival, AoA.

12. The device of claim 10, wherein the beamforming information comprises a beamforming matrix.

13. The device of claim 10, wherein the device is further configured to combine the estimated angular direction with another angle-based positioning method to obtain an improved estimation of the angular direction.

14. The device of claim 10, wherein the device is further configured to combine the estimated angular direction with a range-based positioning method to obtain an improved estimation of the angular direction.

15. The device of claim 14, wherein the range-based positioning method comprises fine timing measurement, FTM.

16. The device of claim 10, wherein the processing circuit is further configured to combine the estimated angular direction with an output of another angle-based positioning technique to obtain an improved estimation of the angular direction.

17. The device of claim 10, wherein the processing circuit is further configured to combine the estimated angular direction with an output of a range-based positioning technique to obtain an improved estimation of the angular direction.

18. The device of claim 10, wherein the processing circuit is further configured to:
initiate a channel sounding procedure for beamforming to the wireless device using rank-1 beamforming,
wherein the processing circuity being configured to extract the direction information comprises the processing circuit being configured to extract the directional information from the beamforming information comprised in the channel sounding feedback obtained from the wireless device in response to initiating the channel sounding procedure.

19. A computer program comprising instructions, which when executed by at least one processor, cause the at least one processor to:
initiate a channel sounding procedure for beamforming to a wireless device using rank-1 beamforming;
extract, in response to initiating the channel sounding procedure, directional information from beamforming information comprised in the channel sounding feedback obtained from the wireless device; and
estimate an angular direction to the wireless device based on the extracted directional information.

20. The computer program of claim 19 wherein causing the at least one processor to extract the directional information comprises causing the at least one processor to extract the directional information from beamforming information comprised in the channel sounding feedback received from the wireless device by an antenna array coupled to the at least one processor,
wherein causing the at least one processor to estimate the angular direction comprises causing the at least one processor to estimate the angular direction to the wireless device relative to the antenna array based on the extracted directional information,
the instructions, when executed by the at least one processor, further causing the at least one processor to:
determine information of the wireless device based on the estimated angular direction to the wireless device and location information of the antenna array; and
transmit the position information to the wireless device.

* * * * *